United States Patent [19]

Fehrenbach et al.

[11] Patent Number: 4,729,360

[45] Date of Patent: Mar. 8, 1988

[54] DAMPER ELEMENT

[75] Inventors: Siegfried Fehrenbach, Markgröningen; Wolfgang Golderer, Schwieberdingen; Kurt Herbst, Burgstetten; Erwin Krimmer, Plüderhausen; Paul Schmid, Kornwestheim; Wilhelm Sorg, Markgröningen-Unterriexingen; Eberhard Utz, Stuttgart, all of Fed. Rep. of Germany

[73] Assignee: Robert Bosch GmbH, Stuttgart, Fed. Rep. of Germany

[21] Appl. No.: 907,178

[22] Filed: Sep. 16, 1986

Related U.S. Application Data

[63] Continuation of Ser. No. 375,909, May 7, 1982, abandoned.

[30] Foreign Application Priority Data

May 14, 1981 [DE] Fed. Rep. of Germany ....... 3119131

[51] Int. Cl.$^4$ .............................................. F02M 39/00
[52] U.S. Cl. .................................... 123/447; 123/467; 123/456
[58] Field of Search ............... 123/447, 457, 511, 512, 123/513, 514, 467, 456; 251/368, 331; 428/473.5, 63

[56] References Cited

U.S. PATENT DOCUMENTS

| | | | |
|---|---|---|---|
| 2,595,127 | 4/1952 | Coffey | 264/160 |
| 2,598,202 | 5/1952 | Wirth et al. | 123/512 |
| 3,507,263 | 4/1970 | Long | 123/456 |
| 3,824,974 | 7/1974 | La Flame et al. | 123/511 |
| 4,050,855 | 9/1977 | Sakamaki et al. | 418/152 |
| 4,161,964 | 7/1979 | Greiner et al. | 123/447 |
| 4,205,637 | 6/1980 | Ito et al. | 123/457 |

FOREIGN PATENT DOCUMENTS

| | | | |
|---|---|---|---|
| 314474 | 11/1929 | United Kingdom | 123/447 |
| 314472 | 1/1930 | United Kingdom | 123/447 |

Primary Examiner—Carl Stuart Miller
Attorney, Agent, or Firm—Edwin E. Greigg

[57] ABSTRACT

A damper element is proposed which serves to damp a pulsating fluid flow, in particular to smooth out and reduce pressure fluctuations arising in fuel supply systems for internal combustion engines in motor vehicles. The damper element includes a base and a cap, which are welded to one another and a damper diaphragm is clamped between these elements. The damper diaphragm, in order to prevent diffusion of the fluid into a damper chamber of the cap, is embodied either as a polyimide diaphragm or as a combination of a fabric diaphragm and a polyimide diaphragm. The clamping area of the cap is embodied as inclined slightly toward the damper diaphragm by an angle α, so that a long-term fastening and sealing of the damper diaphragm is assured.

13 Claims, 5 Drawing Figures

DAMPER ELEMENT

This is a continuation of copending application Ser. No. 375,909, filed May 7, 1982, now abandoned.

BACKGROUND OF THE INVENTION

The invention is based on a damper element for damping a pulsating fluid flow particularly for smoothing out and reducing pressure fluctuations arising in fuel supply systems for internal combustion engines of motor vehicles having at least one elastic, non-metallic damper diaphragm. A damper element is already known which in order to smooth out and reduce pressure fluctuations communicates with the pressurized fuel of a fuel injection system and has a fabric diaphragm as its damper member. The fabric diaphragm is not absolutely impermeable to fuel, however, so that over a relatively long period in operation, more and more fuel diffuses through the fabric diaphragm into the damper chamber located behind it, the damper chamber being unventilated for safety reasons. The fuel collecting in the damper chamber impairs the damping effect more and more with time, until the damping effect actually ceases.

OBJECT AND SUMMARY OF THE INVENTION

The damper element according to the invention, intended for damping a pulsating fluid flow has the advantage over the prior art that the passage of fuel through the damper diaphragm is prevented, at least to such an extent that the damper element retains its function over the required period in operation without impairment of the damping behavior.

The principal object of the invention is to provide an elastic, non-metallic diaphragm, which is in operative communication on one side with fluid and is clamped across a metal damper housing comprising a base and a cap, of polyimide.

It is further particularly advantageous to weld the base and cap of the damper housing together in order to reduce the danger of their destruction, such as may happen in an automobile accident, and to provide a clamping area on the cap which is slightly inclined toward the damper diaphragm and over the required service life of the damper element assures the proper fastening and sealing of the damper diaphragm.

It is also advantageous to clamp the damper diaphragm between a plastic cap and a plastic ring sealingly connected therewith and to dispose these elements in the interior of the welded damper housing.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
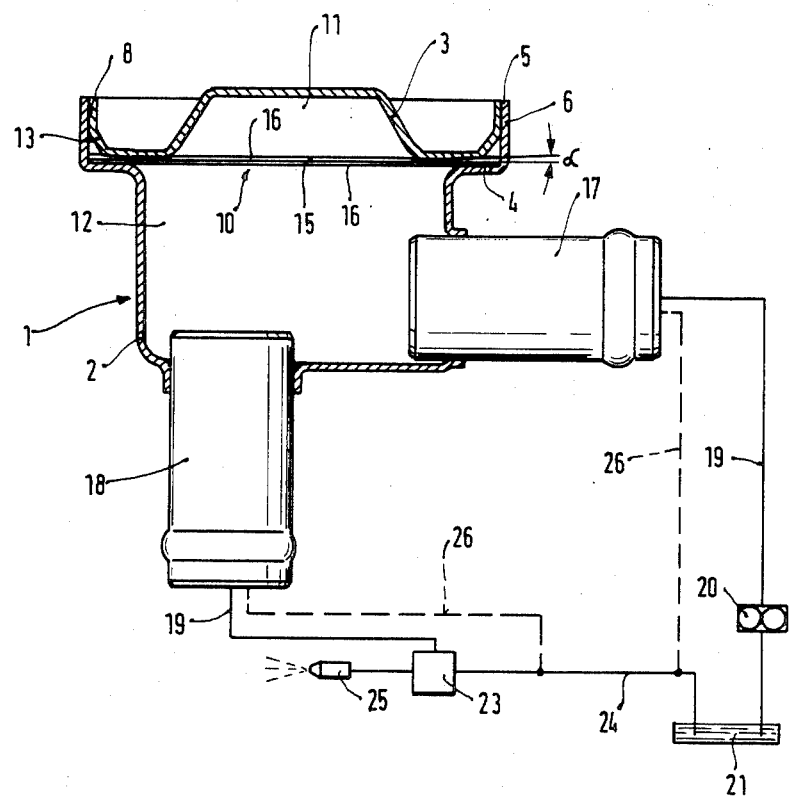
FIG. 1 shows a first exemplary embodiment of a damper element.

The damper element 1 shown in FIG. 1 has a damper housing comprising a base 2 and a cap 3. The base 2 has an outwardly extending step or flange 4, which is adjoined in the axial direction, oriented toward the open end 5, by an upstanding wall providing a closure section 6. The cap 3 has a rim area 8 associated with the closure section 6 and extending in the axial direction and also has an annular clamping area 9 provided transversely relative to the rim area 8 and associated with the step 4 of the base 2. The closure section 6 of the base 2 and the rim area 8 of the cap 3 are welded to one another, so that even if there is a severe deforming strain, such as may occur in an accident, the chamber surrounded by the damper housing 2, 3 remains sealed. A damper diaphragm 10 is sealingly clamped at its circumference between the clamping area 9 of the cap 3 and the step 4 of the base 2, separating a damper chamber 11 in the cap 3 from a fluid chamber 12 in the base 2. An oblique area 13 is advantageously provided between the rim area 8 and the clamping area 9 of the cap 3; during the assembly of the damper element 1, while the welding procedure is being performed on the base 2 and cap 3, a cooled pressing tool can rest against this oblique area 13. The damper diaphragm 10 may advantageously be made of polyimide 15, and it may be efficacious to provide additional sealing means, such as O rings or rubber washers, at the fastening location of the polyimide diaphragm 15 in order to seal it. The damper diaphragm 10 may, however, also be embodied by a fabric diaphragm 16, with the polyimide diaphragm 15 being clamped in place parallel to it on one side, or else two layers of fabric diaphragm 16 may be provided, between which the polyimide diaphragm 15 is clamped. The fabric diaphragms 16 effect sealing at the circumference, while the polyimide diaphragm prevents diffusion of the fluid from the fluid chamber 12 into the damper chamber 11. Thus, presuming that the damper diaphragm 10, embodied as a polyimide diaphragm 15 alone or also a combination of the polyimide diaphragm 15 and the fabric diaphragm 16, is intact, the passage of fuel into the damper chamber 11 is effectively prevented. The fluid chamber 12 communicates via connector fittings 17, 18 with a fluid-pressure system. The damper element 1 may thus be integrated into a fuel injection system, by way of example, and the connector fitting 17 can communicate via a fuel supply line 19 with the pressure side of a fuel supply pump 20 which supplies fuel in a pulsating manner from a fuel container 21. From the connector fitting 18, the fuel supply line 19 leads to a fuel metering unit 23, which on the one hand permits a certain return flow of the fuel to the fuel container by way of a return-flow line 24 and on the other hand determines the amount of fuel to be injected via a fuel injection valve 25. As indicated by broken lines 26, the damper element may also, however, also communicate with the return-flow line 24.

Figure 2:
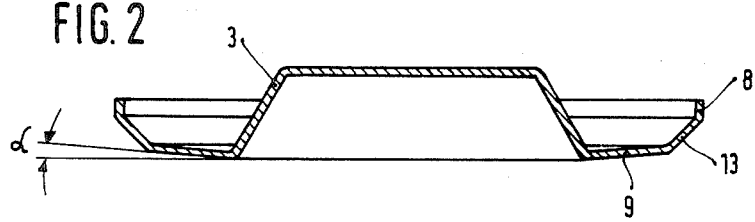
FIG. 2 shows a first embodiment of a cap.

In the case of the cap 3 shown separately in FIG. 2, it is clearly visible that the clamping area 9 of the cap 3 inclines downward from the oblique area 13 toward the center by an angle $\alpha$, so that in the assembled state, a constant tension is exerted on the damper diaphragm 10 at the fastening location. As a result, it is assured that the damper diaphragm 10 will remain in place and sealed over a long period. The size of the angle $\alpha$ is from 1° to 3°.

Figure 3:
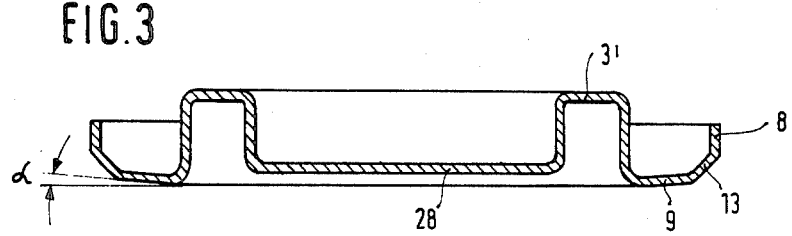
FIG. 3 shows a second embodiment of a cap.

The cap 3' shown in FIG. 3 has a central stop area 28, which limits the deflecting movement of the damper diaphragm 10 and thus prevents excessive stretching on the part of the damper diaphragm 10, particularly at very high fluid pressures.

Figure 4:
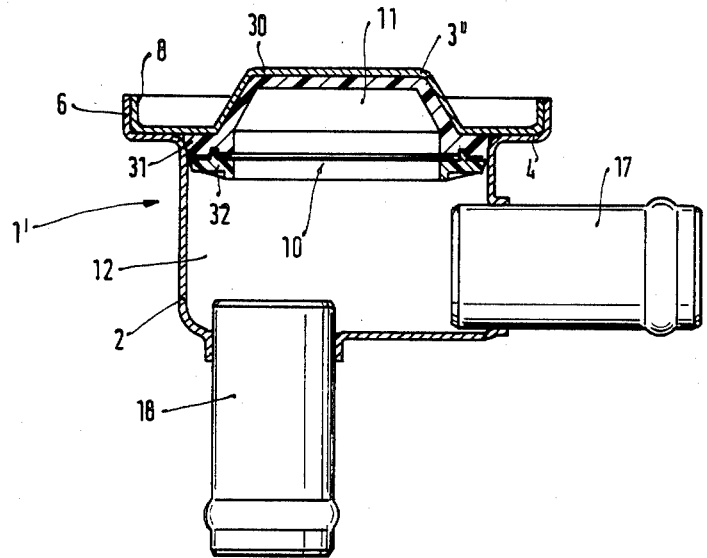
FIG. 4 shows a second exemplary embodiment of a damper element.
Figure 5:
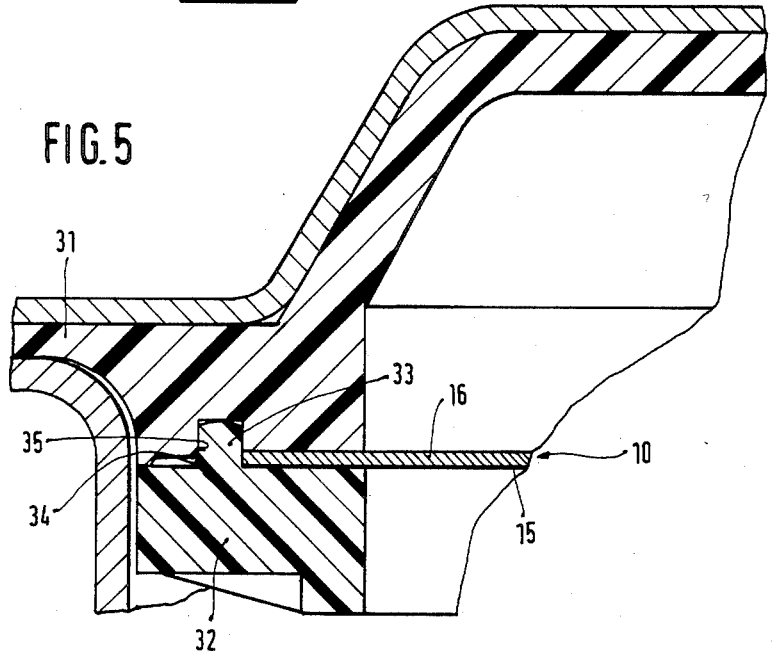
FIG. 5 is an enlarged fragmentary illustration showing part of the damper element according to FIG. 4.

In the further damper element 4' of FIG. 4, the elements still the same as and having the same function as those of the corresponding damper element 1 of FIG. 1 are identified by identical reference numerals. In the damper element 1' of FIG. 4, a plastic cap 30 is embedded in the damper housing 2, 3" which has been welded at 6, 8. The plastic cap 30 for the most part rests on the cap 3" and in order to fix its position it engages an interstice formed between the base 2 and the cap 3" with an annular step 31. As shown in more detail in FIG. 5, a plastic ring 32 rests on the side of the plastic cap 30 remote from the cap 3". The plastic ring 32 is sealingly connected with the plastic cap 30, for example by ultrasonic welding, and the damper diaphragm 10 is held clamped in place between the plastic ring 32 and the plastic cap 30. The damper diaphragm 10 here may be embodied by the polyimide diaphragm 15 or by a combination of the polyimide diaphragm 15 and the fabric diaphragm 16. It may be efficacious to provide upstanding protuberances 33 on the plastic ring 32, which engage means defining openings 34 in the polyimide diaphragm 15 and protrude into corresponding recesses 35 of the plastic cap 30. The polyimide diaphragm 15 is thus firmly clamped into place in the radial direction at the tangs 33. Welding of the tangs 33 to the plastic cap 30 simultaneously increases the strength of the unit as a whole.

The foregoing relates to preferred exemplary embodiments of the invention, it being understood that other embodiments and variants thereof are possible within the spirit and scope of the invention, the latter being defined by the appended claims.

What is claimed and desired to be secured by letters patent of the United States is:

1. A damper element for damping a pulsating fluid flow particularly for smoothing out and reducing pressure fluctuations arising in a fuel supply system for internal combustion engines of motor vehicles comprising a damper housing, said housing including a base and a cap, said base and said cap having substantially coincidental circumferences which are welded together after assembly, a plastic cap in said damper housing, a plastic ring affixed to said plastic cap, a continuous elastic, nonmetallic damper diaphragm formed of polyimide clamped between said plastic cap and said plastic ring, said plastic cap including recesses therein, said plastic ring including protuberances that extend into said recesses in said plastic cap and said polyimide diaphragm further includes a notched perimeter arranged to receive said protuberances on said plastic ring whereby said polyimide diaphragm is in operative communication with fuel of said fuel supply system.

2. A damper element for damping a pulsating fluid flow particularly for smoothing out and reducing pressure fluctuations arising in fuel supply systems for internal combustion engines of motor vehicles comprising a metal damper housing, said housing including a cylindrical base having an outwardly extending flange 4 relative to its axis, with an upwardly axially extending wall closure section 6 integral therewith, a cap 3 having an annular clamping flange area 9 at an angle with respect to its axis with an upwardly, axially extending rim area 8 integral with said flange area 9 which extends outwardly to an end 5 of said upwardly axially extending wall closure section 6, at least one continuous elastic, non-metallic damper diaphragm formed of a continuous piece of polyimide which extends entirely across an opening formed by said cylindrical base and which is supported along its periphery by said base and clamped between said flange of said base and said flange of said cap of said housing along its periphery to form a closed air-tight chamber between said diaphragm and said cap which is free of atmospheric pressure and free of any structural element attached thereto, said diaphragm being free to move axially relative to said closed chamber between said diaphragm and said cap and in operative communication with fuel of said supply system to define a closed damper chamber within said base.

3. A damper element as defined by claim 2, characterized in that each said base and said cap have substantially coincidental circumferences which are welded after assembly, a plastic cap in said damper housing, said plastic cap rests on said cap and is fixed in position by an annular step 31 engaging an interstice formed between the base and the cap, said damper diaphragm being clamped along its periphery between said plastic cap and a plastic ring sealingly connected with said plastic cap.

4. A damper element as defined by claim 3, characterized in that said plastic ring and the plastic cap are affixed together.

5. A damper element as defined by claim 4, characterized in that protuberances provided on the plastic ring and said polyimide diaphragm is provided with means defining openings for receipt of said protuberances.

6. A damper element as defined by claim 2, in which said at least one damper diaphragm is sealingly pressed by said cap against said flange of said base and said upwardly extending wall closure section is welded to said rim of said cap to secure said cap to said closure section.

7. A damper element as defined by claim 6 in which said annular clamping flange of said cap is formed on a angle $\alpha$ which slopes downward toward a central axis from an oblique area which extends to said upwardly axially extending rim area 8 whereby said cap exerts a constant tension on said diaphragm and said flange of said base.

8. A damper element as defined by claim 7, characterized in that said cap further includes a central stop area to limit deflection movement of said damper diaphragm.

9. A damper element as defined by claim 2, which includes a fabric diaphragm which is clamped between said flange of said base and said flange of said cap in which said at least one polyimide diaphragm is disposed in a parallel plane at least at one side of said fabric diaphragm.

10. A damper element as defined by claim 9, characterized in that each said base and said cap have substantially coincidental circumferences which are welded after assembly, a plastic cap in said damper housing, said damper diaphragm being clamped along its periphery between said plastic cap and a plastic ring sealingly connected with said plastic cap.

11. A damper element as defined by claim 10, characterized in that said plastic ring and the plastic cap are affixed together.

12. A damper element as defined by claim 9, characterized in that said base of said damper housing has an outwardly extending step and an upstanding closure section adjacent thereto arranged to extend in an axial direction and further that said damper diaphragm is sealingly pressed by said cap against said step and a weld means to secure said cap to said closure section.

13. A damper element as defined by claim 12 in which said annular clamping flange of said cap is formed on a angle $\alpha$ which slopes downward toward a central axis from an oblique area which extends to said upwardly axially extending rim area 8 whereby said cap exerts a constant tension on said diaphragm and said flange of said base.

* * * * *